United States Patent
Jansma et al.

(10) Patent No.: US 10,946,905 B2
(45) Date of Patent: Mar. 16, 2021

(54) VEHICULAR BODY STRUCTURAL ARRANGEMENTS

(71) Applicant: Toyota Motor Engineering & Manufacturing North America, Inc., Plano, TX (US)

(72) Inventors: Matthew A. Jansma, Saline, MI (US); Christopher M. Higgins, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 155 days.

(21) Appl. No.: 16/377,969

(22) Filed: Apr. 8, 2019

(65) Prior Publication Data
US 2020/0317277 A1    Oct. 8, 2020

(51) Int. Cl.
*B62D 33/077* (2006.01)
*B62D 21/09* (2006.01)
*B62D 33/02* (2006.01)
*F16B 5/02* (2006.01)
*B62D 25/20* (2006.01)

(52) U.S. Cl.
CPC .......... *B62D 33/077* (2013.01); *B62D 21/09* (2013.01); *B62D 25/2027* (2013.01); *B62D 33/02* (2013.01); *F16B 5/02* (2013.01)

(58) Field of Classification Search
CPC ...... B62D 33/077; B62D 33/02; B62D 21/09; B62D 25/2027; F16B 5/02
USPC ........................................................ 296/35.1
See application file for complete search history.

(56) References Cited

U.S. PATENT DOCUMENTS

| | | | |
|---|---|---|---|
| 2,882,090 A | | 4/1959 | Sewelin |
| 5,040,917 A | * | 8/1991 | Camuffo ................ B62D 21/09 403/408.1 |
| 6,050,503 A | * | 4/2000 | Suhring .................... B05B 1/08 239/284.1 |
| 6,059,503 A | * | 5/2000 | Johnson ................ F16B 41/002 411/353 |
| 6,361,096 B2 | * | 3/2002 | Kim ....................... B62D 24/02 248/635 |
| 6,394,537 B1 | | 5/2002 | DeRees |
| 9,073,586 B1 | | 7/2015 | Courtright et al. |
| 9,994,262 B1 | | 6/2018 | Kube et al. |
| 2005/0040676 A1 | | 2/2005 | Cikuchi |
| 2005/0241253 A1 | * | 11/2005 | Song ..................... F16B 5/0056 52/578 |
| 2013/0278020 A1 | | 10/2013 | Preisler et al. |
| 2015/0375805 A1 | | 12/2015 | Courtright et al. |

(Continued)

*Primary Examiner* — Pinel E Romain
(74) *Attorney, Agent, or Firm* — Christopher G. Darrow; Darrow Mustafa PC (57) ABSTRACT

A vehicle includes a frame rail, a crossbeam resting atop the frame rail, a deck panel resting atop the crossbeam, an adaptor resting inside the crossbeam, and a fastener extending from atop the adaptor to the frame rail through the adaptor and the crossbeam. The deck panel includes an aperture and a bordering area around the aperture. The adaptor rises through the aperture and overtop the bordering area. The fastener overhangs the bordering area and is engaged with the adaptor overtop the bordering area, and is secured to the frame rail. The fastener thereby secures the adaptor to the frame rail against the crossbeam without tightening against the deck panel at the bordering area.

20 Claims, 4 Drawing Sheets

(56) References Cited

U.S. PATENT DOCUMENTS

2017/0233016 A1    8/2017  Courtright et al.
2018/0205286 A1*   7/2018  Barekar ................. F02B 63/00

* cited by examiner

VEHICULAR BODY STRUCTURAL ARRANGEMENTS

TECHNICAL FIELD

The embodiments disclosed herein relate to the bodies of vehicles and, more particularly, to structural arrangements for the bodies of vehicles with beds.

BACKGROUND

The bodies of vehicles and, more particularly, the structural arrangements for the bodies of vehicles with beds, have long been a focus of automotive design. Some of these structural arrangements involve bodies that, in association with the beds, include polymeric body elements or other alternatives to traditional metallic body elements.

SUMMARY

Disclosed herein are embodiments of a structural arrangement for the body of a vehicle with a bed. In one aspect, a vehicle includes a frame rail, a crossbeam resting atop the frame rail, a deck panel resting atop the crossbeam, an adaptor resting inside the crossbeam, and a fastener extending from atop the adaptor to the frame rail through the adaptor and the crossbeam. The deck panel includes an aperture and a bordering area around the aperture. The adaptor rises through the aperture and overtop the bordering area. The fastener overhangs the bordering area and is engaged with the adaptor overtop the bordering area, and is secured to the frame rail. The fastener thereby secures the adaptor to the frame rail against the crossbeam without tightening against the deck panel at the bordering area.

In another aspect, a vehicle includes a frame rail, a hat-shaped crossbeam resting atop the frame rail, a polymeric deck panel resting atop the crossbeam, an adaptor resting inside the crossbeam, and a fastener securing the adaptor to the frame rail against the crossbeam. The crossbeam includes a base engaged with the frame rail, upturned sides extending from the base, and outturned rests respectively extending from the sides. The deck panel rests atop the crossbeam on the rests, and the adaptor rests inside the crossbeam on the base. The deck panel includes an aperture and a bordering area around the aperture. The adaptor includes a footing engaged with the base, and a riser projecting from the footing between the sides. The riser rises through the aperture and overtop the bordering area, and includes a shoulder underhanging the bordering area. The fastener includes a head atop the adaptor, and a threaded shank extending to the frame rail through the adaptor and the crossbeam. The head overhangs the bordering area and is engaged with the riser overtop the bordering area, and the threaded shank is threaded with the frame rail. The fastener thereby secures the adaptor to the frame rail against the crossbeam without tightening against the deck panel at the bordering area.

In yet another aspect, a vehicle includes a metallic frame rail, a metallic hat-shaped crossbeam resting atop the frame rail, a unitarily-formed polymeric bed box resting atop the crossbeam, a metallic adaptor having a casted construction resting inside the crossbeam, and a metallic fastener securing the adaptor to the frame rail against the crossbeam. The crossbeam includes a base engaged with the frame rail, upturned sides extending from the base, and outturned rests respectively extending from the sides. The sides each include an outward cant and an upward rise. The bed box rests atop the crossbeam on the rests, and the adaptor rests inside the crossbeam on the base. The bed box includes a deck panel, side panels and a bulkhead panel. The deck panel includes a crosswise corrugation engaged with the rests. The corrugation includes a swell between the rests, where the deck panel includes an aperture and a bordering area around the aperture. The bordering area includes a downturned edge flange coinciding with the aperture. The adaptor includes a footing engaged with the base and the sides, and a riser projecting from the footing between the sides. The footing includes a baseplate engaged with the base and upturned side lips engaged with the outward cant. The riser includes a tube rising through the aperture with a gap between the tube and the bordering area whose rim is overtop the bordering area, and circumferentially-spaced fins projecting from the tube whose ends form shoulders underhanging the edge flange with gaps between the shoulders and the edge flange. The fastener includes a head atop the adaptor inside the swell, and a threaded shank extending to the frame rail through the adaptor and the crossbeam. The head overhangs the bordering area and is engaged with the rim overtop the bordering area with a gap between the head and the bordering area. The threaded shank is threaded with the frame rail. The fastener thereby secures the adaptor to the frame rail against the crossbeam without tightening against the deck panel at the bordering area.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a structural arrangement for realizing the benefits of a vehicle with a bed whose body includes associated polymeric body elements, including as part of a unitarily-formed polymeric bed box. Among other things, the vehicle enjoys improved mass compared to otherwise similar vehicles with traditional metallic body elements. Moreover, the polymeric body elements offer vehicle manufacturers opportunities for improved manufacturability, improved cost and the like.

In addition to the polymeric body elements, the body includes other body elements, including metallic body elements, for structural reinforcement and the like. As part of the body, a fastener-based structural arrangement is used to secure neighboring body elements, including metallic body elements, to one another without tightening the fasteners against the polymeric body elements. Although these and other teachings find application in the vehicle disclosed herein, it will be understood that this disclosure is applicable in principle to otherwise similar vehicles with any combination of polymeric body elements, other non-metallic and metallic alternatives to traditional metallic body elements, and traditional metallic body elements.

Figure 1A:
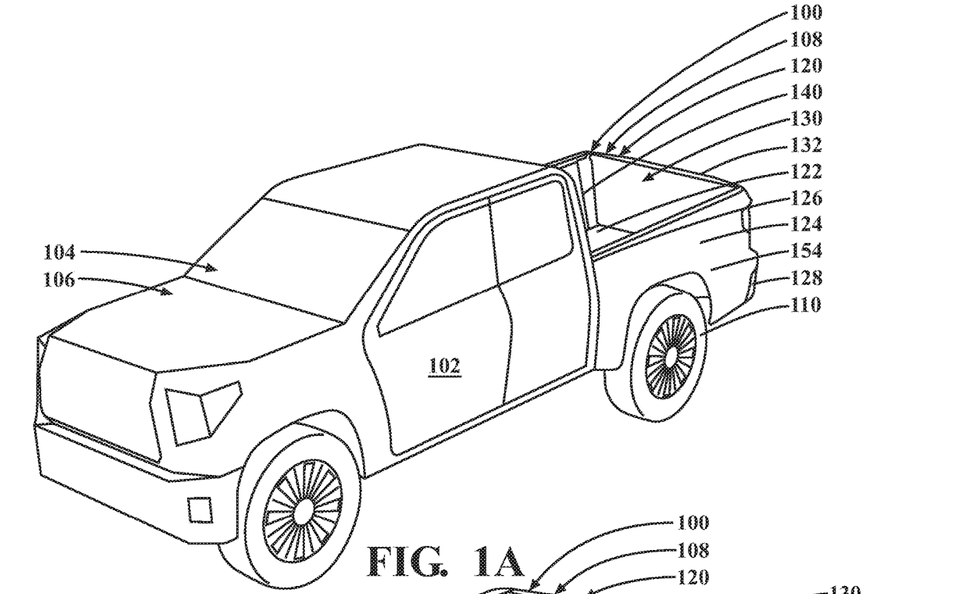
FIG. 1A is a perspective view of a vehicle with a bed whose body includes a polymeric bed box.
Figure 1B:
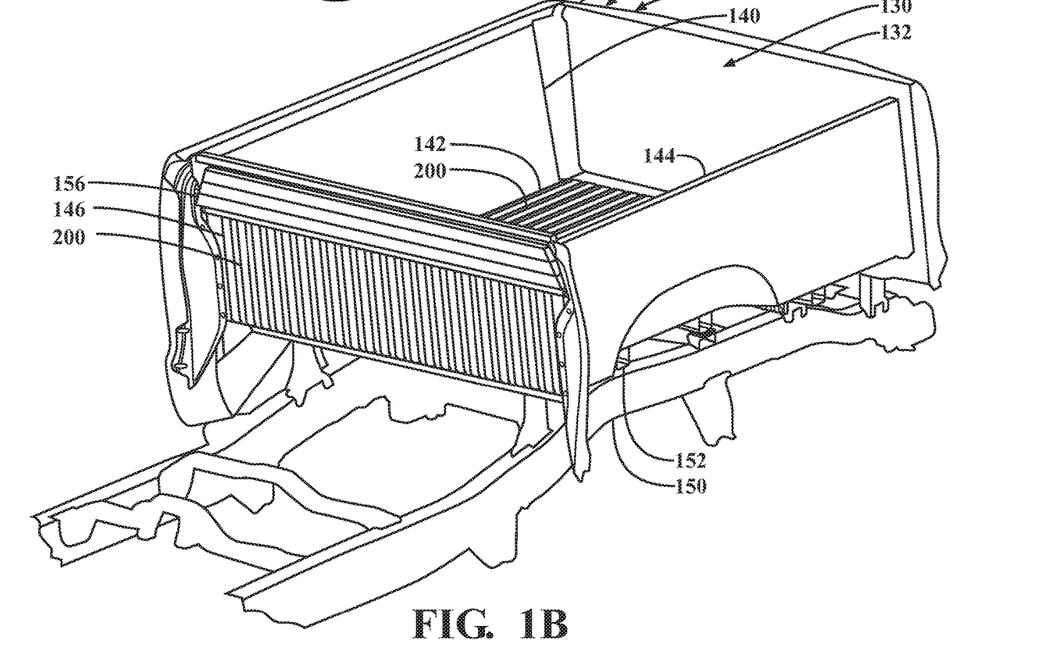
FIG. 1B is a perspective view of the body with a rear quarter panel removed for better viewing, showing frame rails, crossbeams resting atop the frame rails, a deck panel of the bed box resting atop the crossbeams, and a reinforcement backed against a bulkhead panel of the bed box.

A representative passenger vehicle 100 is shown in FIGS. 1A and 1B. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

As shown, the vehicle 100 is a pickup truck. The vehicle 100 includes an exterior 102 and a number of interior compartments. The compartments include a passenger compartment 104, an engine compartment 106 and, in the illustrated pickup truck configuration of the vehicle 100, an open-topped bed 108 for carrying cargo. Among other things, the vehicle 100 may include seats, a dash assembly, an instrument panel, controls and the like housed in the passenger compartment 104. Additionally, the vehicle 100 may include an engine, a motor, a transmission and the like, as well as other powertrain components, such as wheels 110, housed in the engine compartment 106 and elsewhere in the vehicle 100. The wheels 110 support the remainder of the vehicle 100 on the ground. One, some or all of the wheels 110 are powered by the remainder of the powertrain components to drive the vehicle 100 along the ground.

The vehicle 100 includes a body 120 that forms the exterior 102 and defines or otherwise encloses the bed 108 and other compartments. In relation to the bed 108, the body 120 includes a deck 122, two sides 124, a bulkhead 126 and a rear end 128. Additionally, in relation to the passenger compartment 104 and the engine compartment 106, the vehicle 100 may include a floor forward of the deck 122, a partition forward of the bulkhead 126, a front end, a roof, a hood and the like. At the rear end 128, the body 120 defines a tailgate opening 130. Similarly to other openings that open between the compartments and the exterior 102, the tailgate opening 130 opens between the bed 108 and the exterior 102. Relatedly, as part of the rear end 128, the body 120 includes a tailgate 132 corresponding to the tailgate opening 130. Similarly to other closure panels that correspond to other openings, the tailgate 132 is pivotally connected to the remainder of the body 120 for movement, relative to the tailgate opening 130, between a closed position over the tailgate opening 130, and an open position away from the tailgate opening 130.

The body 120 is constructed from any combination of rigidly interconnected frame members, panels and other body elements, as well as any combination of overlying paneling, trim, upholstery and other body coverings. In relation to the bed 108, the body 120 includes an open-topped bed box 140. Also referable to as an "inner," the bed box 140 is different from bed liners insofar as that while bed liners are essentially body coverings, the bed box 140 is a body element, and includes body sub-elements, indispensable to the construction of the body 120 itself. The bed box 140 includes a deck panel 142, two side panels 144 and a bulkhead panel 146. As part of the deck 122, the body 120 includes the deck panel 142 as an overlying body element, as well as two frame rails 150 and a number of crossbeams 152 as underlying body elements. Moreover, as part of the sides 124, the body 120 includes the side panels 144 as inner body elements, as well as two rear quarter panels 154 (one shown, with the other being a mirror image) as outer body elements. Moreover, as part of the bulkhead 126, the body 120 includes the bulkhead panel 146 as an inner body element, as well as an elongate reinforcement 156 as an outer body element. At the rear end 128, the body 120 defines the tailgate opening 130 in the space between side panels 144.

The deck 122 is horizontal, and extends longitudinally between the bulkhead 126 and the rear end 128, and laterally between the sides 124. At the deck 122, as part of the body 120, the frame rails 150, the crossbeams 152 and the deck panel 142 are secured to one another. Relatedly, the bed box 140 is secured at the deck panel 142 to the frame rails 150 via the crossbeams 152. As part of the deck 122, the frame rails 150, the crossbeams 152 and the deck panel 142 are horizontal, and vertically spaced apart from one another, with the crossbeams 152 overlying and resting atop the frame rails 150, and the deck panel 142, as well as the bed box 140 to which the deck panel 142 belongs, overlying and resting atop the crossbeams 152. The frame rails 150 are laterally spaced apart from one another, and extend longitudinally along the sides 124, from forward of the bulkhead 126, between the bulkhead 126 and the rear end 128. The crossbeams 152 are longitudinally spaced apart from one another between the bulkhead 126 and the rear end 128, and extend laterally between the frame rails 150 along the sides 124. The deck panel 142 extends longitudinally from the bulkhead 126, and laterally between the frame rails 150 along the sides 124.

The bulkhead 126 is upright, and extends vertically from the deck 122, and laterally between the sides 124. At the bulkhead 126, as part of the body 120, the bulkhead panel 146 and the reinforcement 156 are secured to one another. As part of the bulkhead 126, the bulkhead panel 146 and the reinforcement 156 are upright, and longitudinally spaced apart from one another, with the reinforcement 156 forward of and backed against the bulkhead panel 146. The bulkhead panel 146 extends vertically from the deck 122, and laterally between the frame rails 150 along the sides 124. The reinforcement 156 extends vertically from above the deck 122, and laterally between the frame rails 150 along the sides 124.

In relation to the bed box 140, the deck panel 142, as part of the bed box 140, extends longitudinally from the bulkhead panel 146, and laterally between the side panels 144. Moreover, the frame rails 150 extend longitudinally across the deck panel 142 alongside the lateral peripheries thereof. Moreover, the crossbeams 152 extend laterally across the deck panel 142 between the lateral peripheries thereof to end flush with the side panels 144. Relatedly, as part of the deck panel 142, the bed box 140 includes frame rail footprints and crossbeam footprints therefor respectively corresponding to the locations where the frame rails 150 and the crossbeams 152 extend or, in a preassembled state, will extend across the deck panel 142. As part of an integral unit with the bed box 140, the crossbeams 152 are directly secured thereto, including to the deck panel 142. Moreover, with the crossbeams 152 secured to the deck panel 142, the crossbeams 152 are secured to the frame rails 150.

The bulkhead panel 146, as part of the bed box 140, extends vertically from the deck panel 142, and laterally between the side panels 144. Moreover, the reinforcement 156 extends vertically from above the deck panel 142 across approximately the uppermost ⅓ of the bulkhead panel 146, laterally across the bulkhead panel 146 between the lateral peripheries thereof, and laterally past the bulkhead panel 146 to end laterally outside the junctions between the bulkhead panel 146 and the side panels 144. As part of an integral unit with the bed box 140, the reinforcement 156 is directly secured thereto, including to the bulkhead panel 146.

The bed box 140 has a molded or otherwise unitarily-formed construction. Moreover, the bed box 140 is made from one or more high-strength, durable and corrosion-resistant polymeric materials. For instance, the bed box 140 may be made from one or more fiber-reinforced thermosetting resins suitable for compression molding, such as sheet molding compound, including sheet molding compound featuring polyester and any combination of glass fibers (i.e., fiberglass), carbon fibers and the like. The body elements besides the bed box 140 may have molded constructions, and may be made from one or more polymeric materials suitable for molding, such as thermosetting resins, including fiber-reinforced thermosetting resins. Additionally, or alternatively, the body elements besides the bed box 140 may have any combination of fabricated, bent, stamped, extruded, casted and like constructions, and may be made from one or more metallic materials. For instance, the frame rails 150, the crossbeams 152 and the rear quarter panels 154 may be made from one or more metals, such as steel or aluminum. For instance, the reinforcement 156 has an extruded construction, and may be made from one or more metals suitable for extrusion, such as aluminum.

The body 120 imparts structure to the vehicle 100, including when the vehicle 100 experiences cargo loading or, in other words, locally normal loading on the vehicle 100 by cargo in the bed 108. The body 120, including the deck 122, the sides 124 and the bulkhead 126, plays a principal role in maintaining the bed 108 against cargo loading on behalf of the vehicle 100. Relatedly, each body element included as part of the deck 122, the sides 124 and the bulkhead 126 may play a role in strengthening the body 120 against cargo loading.

Although the bed box 140 includes various surface geometries for increased rigidity, from the perspective of the body 120, the deck panel 142 and the bulkhead panel 146 alone, by design, have insufficient strengths against cargo loading. Rather than increasing the cross-sectional thicknesses of the deck panel 142 and the bulkhead panel 146 or otherwise introducing mass-related compromises for increased strength against cargo loading, the body 120 includes the crossbeams 152 and the reinforcement 156 for structural reinforcement. When the vehicle 100 experiences cargo loading at the deck 122, the crossbeams 152 structurally reinforce the body 120 against the deck panel 142 flexing toward the ground. Similarly, when the vehicle 100 experiences cargo loading at the bulkhead 126, the reinforcement 156 structurally reinforces the body 120 against the bulkhead panel 146 flexing toward the passenger compartment 104.

From its inner location enclosing the bed 108, the bed box 140 directly assumes cargo loading. As noted above, in order to strengthen the bed 108 against cargo loading, the bed box 140 includes various surface geometries for increased rigidity. For instance, as shown with additional reference to FIGS. 2A and 2B, the bed box 140 includes one or more corrugated sections 200. In the corrugated sections 200, the bed box 140 is rigidified or, in other words, has increased rigidity compared to otherwise similar bed boxes with non-corrugated sections.

Figure 2A:
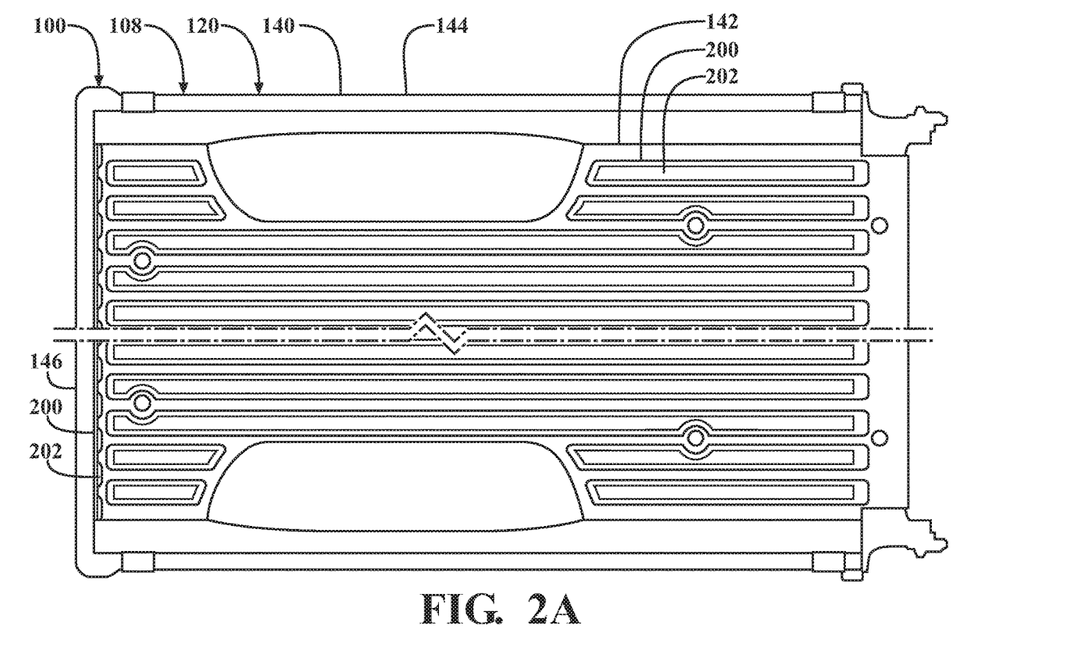
FIGS. 2A and 2B are top and bottom views, respectively, of a unit including the bed box, and the crossbeams and the reinforcement secured thereto, showing a corrugated section across the deck panel, and a corrugated section across the bulkhead panel.
Figure 2B:
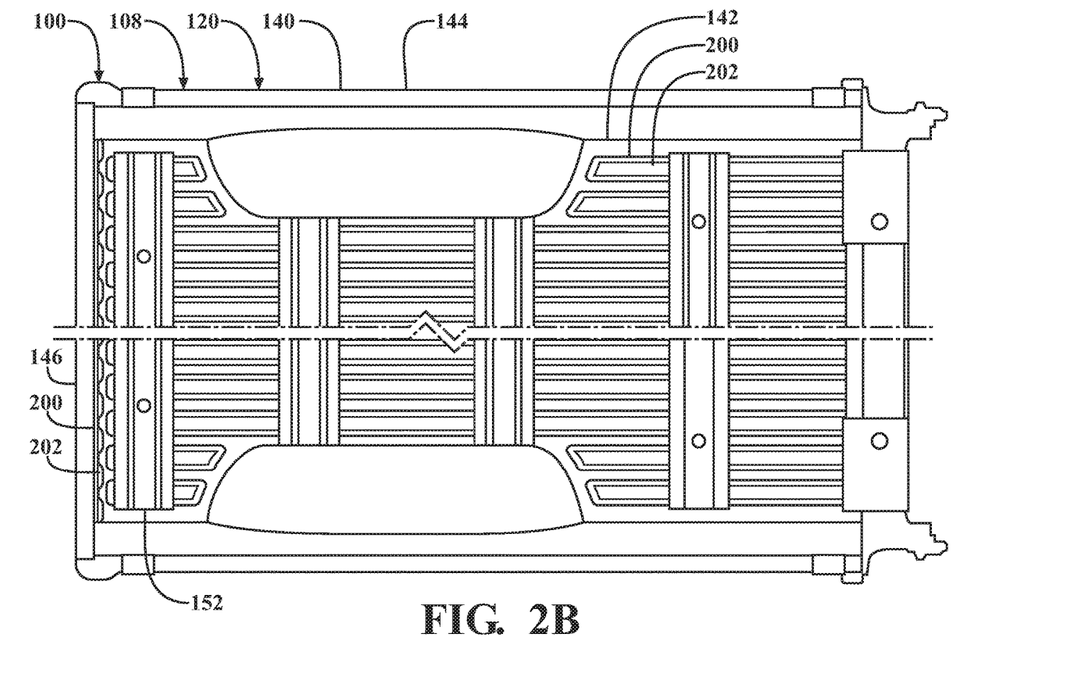

In each corrugated section 200, the bed box 140 is corrugated or, in other words, repeatedly doubled over itself. The bed box 140 thereby includes a series of unitarily-formed corrugations 202 or, in other words, adjacent ridges and valleys. One, some or all of the corrugations 202 may have hollowed trapezoidal cross-sectional shapes. For instance, as shown, each corrugation 202 has a hollowed trapezoidal cross-sectional shape. With the corrugations 202 having hollowed trapezoidal cross-sectional shapes, the corrugations 202 generally simulate a trapezoidal wave, and the bed box 140 includes adjacent flat-topped ridges and flat-bottomed valleys.

The bed box 140 includes a corrugated section 200 across the deck panel 142. In the corrugated section 200, the deck panel 142 is corrugated to include corrugations 202 that, with the deck panel 142 being horizontal, are adjacent underside ridges/topside valleys and topside ridges/underside valleys. In other words, the corrugations 202 are adjacent underside ridges and underside valleys that correspond to adjacent topside valleys and topside ridges. As shown, the deck panel 142 is laterally corrugated, with the corrugations 202 extending longitudinally crosswise to the crossbeams 152. Moreover, the corrugated section 200 is implemented across substantially all of the deck panel 142. Relatedly, with the deck panel 142 resting atop the crossbeams 152, the crossbeams 152 engage with the underside ridges, leaving spaces between the crossbeams 152 and the adjacent underside valleys.

Similarly, the bed box 140 includes a corrugated section 200 across the bulkhead panel 146. In the corrugated section 200, the bulkhead panel 146 is corrugated to include corrugations 202 that, with the bulkhead panel 146 being upright, are adjacent outside ridges/inside valleys and inside ridges/outside valleys. In other words, the corrugations 202 are adjacent outside ridges and outside valleys that correspond to adjacent inside valleys and inside ridges. As shown, the bulkhead panel 146 is laterally corrugated, with the corrugations 202 extending vertically crosswise to the reinforcement 156. Moreover, the corrugated section 200 is implemented across substantially all of the bulkhead panel 146. Relatedly, with the reinforcement 156 backed against the bulkhead panel 146, the reinforcement 156 engages with the outside ridges, leaving spaces between the reinforcement 156 and the adjacent outside valleys.

As noted above, with the crossbeams 152 secured to the deck panel 142, the crossbeams 152 are secured to the frame rails 150. Specifically, the crossbeams 152 are secured to the frame rails 150 at securement points at the deck 122. The securement points are alongside the lateral peripheries of the deck panel 142 where, with the crossbeams 152 and the frame rails 150 crossing, the crossbeams 152 overlie and rest atop the frame rails 150, and the deck panel 142 overlies and rests atop the crossbeams 152.

Figure 3A:
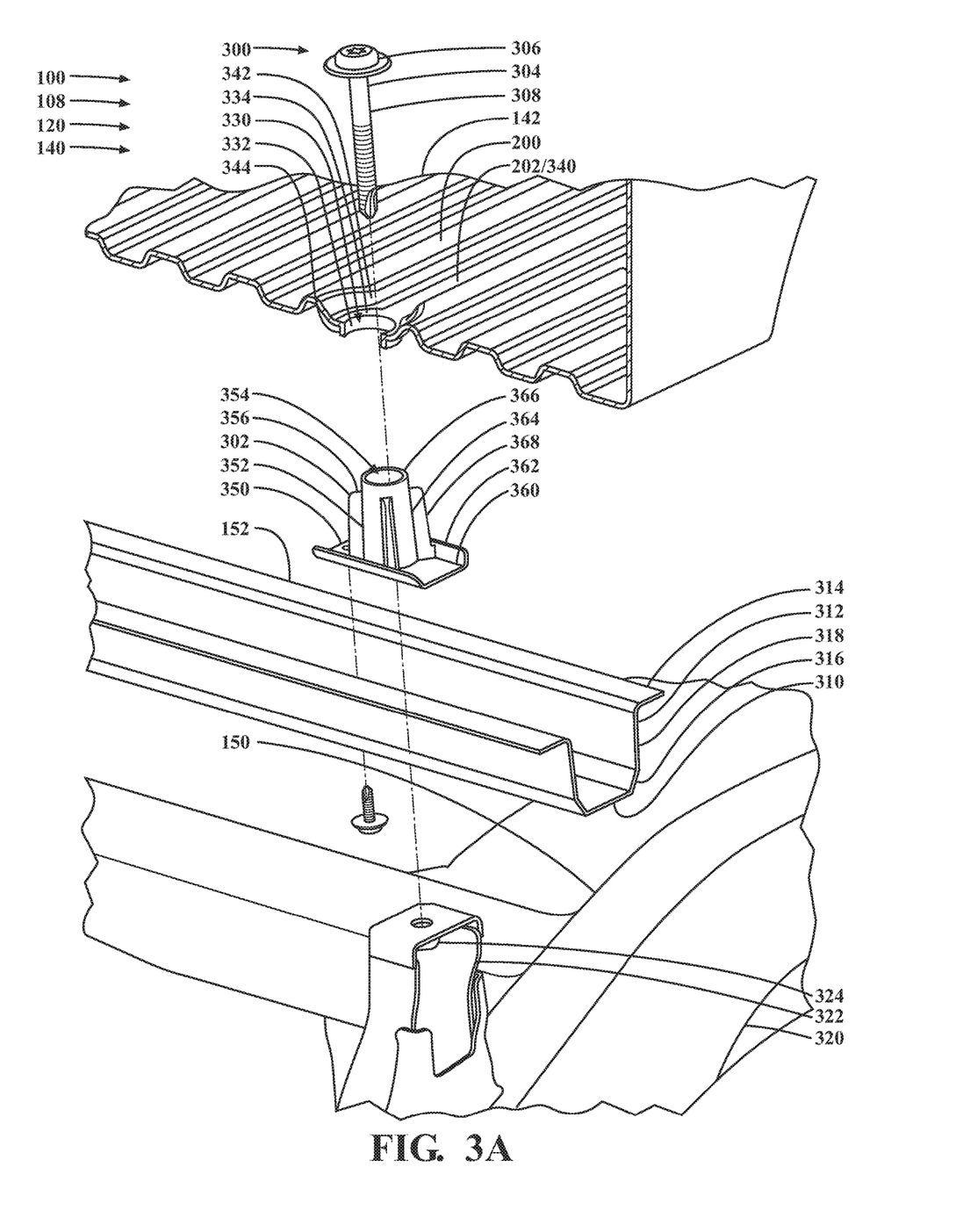
FIG. 3A is an assembly view of a fastener-based structural arrangement for securing a crossbeam to a frame rail, showing the frame rail, the crossbeam and the deck panel, as well as an adaptor for the crossbeam, and a fastener for securing the adaptor to the frame rail against the crossbeam.
Figure 3B:
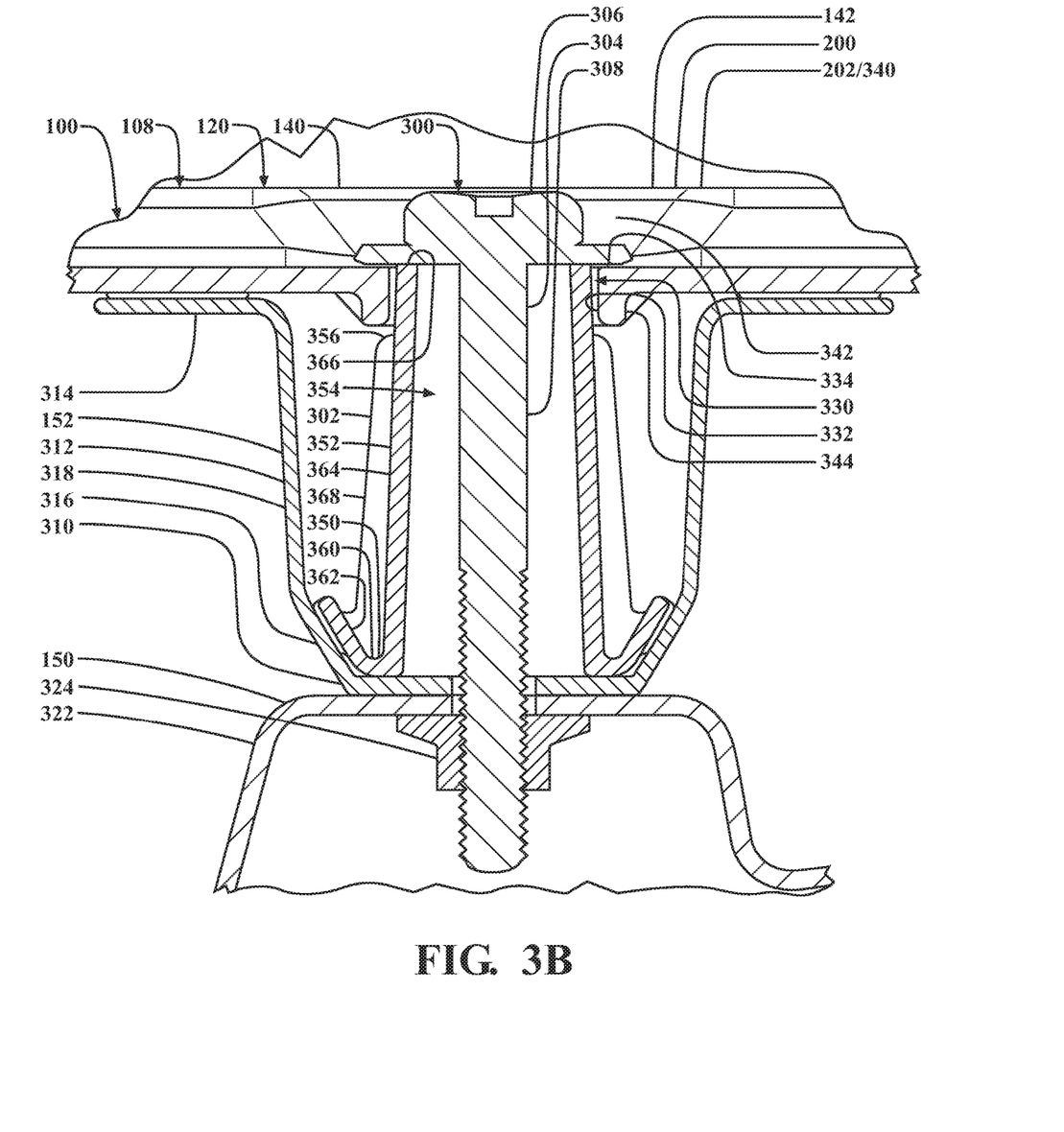
FIG. 3B is a cross-sectional view of the structural arrangement of FIG. 3A, showing the fastener securing the adaptor to the frame rail against the crossbeam without tightening against the deck panel.

As shown with additional reference to FIGS. 3A and 3B, the vehicle 100, as part of the body 120, includes a structural arrangement 300 for securing the crossbeams 152 to the frame rails 150 at one, some or all of the securement points. As shown for a representative structural arrangement 300, each structural arrangement 300 includes or is otherwise associated with the frame rail 150, a crossbeam 152 and the deck panel 142. Moreover, each structural arrangement 300 includes an adaptor 302 for the crossbeam 152, and a fastener 304 for securing the adaptor 302 to the frame rail 150 against the crossbeam 152. As shown, with a configuration typical of screws, bolts and the like, the fastener 304 includes a washered head 306 and a threaded shank 308 projecting from the head 306.

Among other aspects of the structural arrangement 300, with the fastener 304 securing the adaptor 302 to the frame rail 150 against the crossbeam 152, the crossbeam 152 is secured to the frame rail 150 from topside the deck panel 142 without tightening the fastener 304 against the deck panel 142. As opposed to structural arrangements in which a fastener is tightened against the deck panel 142 to secure the deck panel 142 to the frame rail 150 against the crossbeam 152, the deck panel 142 does not suffer the threat of becoming deformed by the fastener 304, and the structural arrangement 300 does not suffer the associated threat of becoming compromised.

As noted above, the body elements besides the bed box 140 may have any combination of constructions, and may be made from one or more metallic materials. For instance, the adaptor 302 has a casted construction, and may be made from one or more metals suitable for casting, such as steel or aluminum. For instance, the fastener 304 may be made from one or more metals, such as steel or aluminum.

In relation to the structural arrangement 300, the crossbeam 152 is channel-like, and has a hat-shaped cross-sectional shape. Relatedly, the crossbeam 152 includes a base 310, two upturned sides 312 extending from the base 310, and two outturned rests 314 for the deck panel 142 respectively extending from the sides 312. With the base 310 being horizontal, the sides 312 being upright and the rests 314 being horizontal, the base 310, the sides 312 and the rests 314 are oriented with the crossbeam 152. As shown, the base 310 and the rests 314 are flat, and each side 312 includes a flat outward cant 316 and a flat upward rise 318.

The frame rail 150 and the crossbeam 152 are mutually configured for resting engagement in which, with the crossbeam 152 resting atop the frame rail 150, the base 310 and the frame rail 150 are engaged with one another. The frame rail 150 includes a main body 320 oriented with the frame rail 150, and a flat-topped support 322 for the crossbeam 152 atop the main body 320. The main body 320 is tubular, and has a generally rectangular cross-sectional shape. The support 322 is welded to or otherwise rigidly connected to the main body 320. The support 322 is upright and, from its position atop the main body 320, projects from the main body 320 normally thereto. As shown, the crossbeam 152 rests atop the frame rail 150 on the support 322, with the base 310 and the support 322 engaged with one another. The frame rail 150 also includes a threaded retainer 324 for the threaded shank 308 undersurface to the support 322 and oriented therewith. As shown, the threaded retainer 324 is a nut.

The crossbeam 152 and the deck panel 142 are mutually configured for resting engagement in which, with the deck panel 142 resting atop the crossbeam 152, the deck panel 142 and the crossbeam 152 are engaged with one another. As shown, with the corrugations 202 being crosswise to the crossbeam 152, the deck panel 142 rests atop the crossbeam 152 on the rests 314, with the corrugations 202 and the rests 314 engaged with one another. Specifically, with the corrugations 202 being adjacent underside ridges and underside valleys, the underside ridges and the rests 314 engage with one another, leaving spaces between the rests 314 and the adjacent underside valleys.

As part of the structural arrangement 300, the deck panel 142 includes an aperture 330 for the adaptor 302 therethrough aligned with the threaded retainer 324. As part of the aperture 330, the deck panel 142 includes a sidewall 332 extending between topside the deck panel 142 and underside the deck panel 142. Relatedly, the deck panel 142 also includes a bordering area 334 around the aperture 330 including and immediately leading from the sidewall 332. With the corrugations 202 engaged with the rests 314, one corrugation 202/340 includes a swell 342 for the head 306 between the rests 314, where the deck panel 142 includes the aperture 330 and the bordering area 334. Specifically, with the corrugations 202 being adjacent underside ridges/topside valleys and topside ridges/underside valleys, the one corrugation 202/340 is an underside ridge/topside valley. As shown, the bordering area 334 includes a unitarily-formed downturned edge flange 344 coinciding with the aperture 330 to continuously extend the sidewall 332.

The adaptor 302 includes an elongate flat-bottomed footing 350 for the crossbeam 152 oriented with the crossbeam 152, a centrally-located riser 352 for the fastener 304 atop the footing 350, and a passage 354 for the fastener 304 therethrough, including through the footing 350, through the riser 352, and between the footing 350 and the riser 352. Moreover, the adaptor 302 includes one or more shoulders 356 for the bordering area 334 aside the riser 352. The riser 352 is upright and, from its position atop the footing 350, projects from the footing 350 normally thereto. The shoulders 356 are horizontal and upward-facing and, from their positions aside the riser 352, project from the riser 352 normally thereto. As shown, the adaptor 302 includes four circumferentially-spaced shoulders 356.

As part of the footing 350, the adaptor 302 includes a rectangular baseplate 360, and two upturned side lips 362 extending from the baseplate 360. With the baseplate 360 being horizontal and the side lips 362 being upright, the baseplate 360 and the side lips 362, as part of the footing 350, are oriented with the crossbeam 152. As shown, the baseplate 360 and the side lips 362 are flat, and the side lips 362 are outwardly canted. To form the riser 352, the adaptor 302 includes a slightly frustoconical tube 364 centrally-located atop the baseplate 360 between the side lips 362. The tube 364 is upright and, from its position atop the baseplate 360, projects from the baseplate 360 normally thereto, and ends in a rim 366. As shown, the adaptor 302 includes the passage 354 through the baseplate 360 and through the tube 364. To form the shoulders 356, the adaptor 302 includes one or more circumferentially-spaced fins 368 aside the tube 364. The fins 368 are upright and, from their positions aside the tube 364, project from the tube 364 radially thereto. The fins 368 extend vertically from the baseplate 360 and the side lips 362 partway along the tube 364, and end in the shoulders 356. As shown, the adaptor 302 includes four circumferentially-spaced fins 368 whose ends form the four circumferentially-spaced shoulders 356.

The adaptor 302 and the crossbeam 152 are mutually configured for resting engagement in which, with the adaptor 302 resting inside the crossbeam 152 in alignment with the threaded retainer 324 and the aperture 330, the adaptor 302 and the crossbeam 152 are engaged with one another. As shown, the adaptor 302 rests inside the crossbeam 152 on the base 310 and against the sides 312, with the footing 350 and the base 310 engaged with one another, and the footing 350 and the sides 312 engaged with one another. Specifically, the baseplate 360 and the base 310 engage with one another, and the side lips 362 and the outward cant 316 engage with one another.

From its position resting inside the crossbeam 152, the adaptor 302 is configured to rise between the sides 312 through the aperture 330 and overtop the bordering area 334, including with a gap between the adaptor 302 and the bordering area 334. As shown, from its position atop the footing 350, the riser 352 projects from the footing 350 to rise through the aperture 330 and overtop the bordering area 334. Moreover, the tube 364, and the riser 352 formed thereby, rise through the aperture 330 with a gap between themselves and the bordering area 334. Specifically, from its position atop the baseplate 360, the tube 364 projects from the baseplate 360 to rise through the aperture 330 and, where it ends in the rim 366, is overtop the bordering area 334. Moreover, with the tube 364 rising through the aperture 330 face-to-face with the sidewall 332, the tube 364 and the sidewall 332 are slightly spaced apart from one another.

From its position resting inside the crossbeam 152, the adaptor 302 is also configured to underhang the bordering area 334, including with a gap between the adaptor 302 and the bordering area 334. Accordingly, the adaptor 302 structurally backs the deck panel 142 against flexing toward the ground in the event the vehicle 100 experiences highly concentrated cargo loading between the rests 314. As shown, from their positions aside the riser 352, the shoulders 356 project from the riser 352 to underhang the bordering area 334. Moreover, the shoulders 356 underhang the bordering area 334 with a gap between the shoulders 356 and the bordering area 334. Specifically, from their positions aside the tube 364, the fins 368 extend partway along the tube 364, and where they end in the shoulders 356, underhang the bordering area 334. Moreover, with the fins 368 ending in the shoulders 356 face-to-face with the bordering area 334, the shoulders 356 and the bordering area 334 are slightly spaced apart from one another. As shown, with the bordering area 334 including the edge flange 344, the shoulders 356 underhang the edge flange 344, including with a gap between the shoulders 356 and the edge flange 344. Specifically, where they end in the shoulders 356, the fins 368 underhang the edge flange 344, and with the fins 368 ending in the shoulders 356 face-to-face with the edge flange 344, the shoulders 356 and the edge flange 344 are slightly spaced apart from one another.

As shown with particular reference to FIG. 3B, in alignment with the threaded retainer 324, the fastener 304 is configured to install, leading with the threaded shank 308, from topside the deck panel 142. With its installation, the fastener 304 is configured to extend from atop the adaptor 302 to the frame rail 150 through the adaptor 302 and the crossbeam 152. From its position at the frame rail 150, the fastener 304 is configured to secure to the frame rail 150, including thread with the frame rail 150. In association therewith, from its position atop the adaptor 302, the fastener 304 is configured to engage with the adaptor 302 overtop the bordering area 334. As shown, with the head 306 atop the adaptor 302, the threaded shank 308 extends to the frame rail 150 through the adaptor 302 and the crossbeam 152, and is threaded with the frame rail 150. Specifically, the threaded shank 308 extends through the passage 354, through the crossbeam 152 and through the support 322, and is threaded with the threaded retainer 324. In association with the threaded shank 308 threading with the frame rail 150, from its position atop the adaptor 302, the head 306 engages the tube 364, and the riser 352 formed thereby, overtop the bordering area 334. Specifically, the head 306 engages the rim 366 overtop the bordering area 334.

From its position overtop the bordering area 334, the fastener 304 is also configured to overhang the bordering area 334, including with a gap between the fastener 304 and the bordering area 334. Accordingly, the fastener 304 conceals the aperture 330 and the adaptor 302, including the tube 364 and the riser 352 formed thereby. As shown, from its position overtop the bordering area 334, the head 306 overhangs the bordering area 334. Moreover, the head 306 overhangs the bordering area 334 with a gap between the head 306 and the bordering area 334. Specifically, with the head 306 face-to-face with the bordering area 334, the head 306 and the bordering area 334 are slightly spaced apart from one another. As shown, from its position overtop the bordering area 334, the head 306 is also inside the swell 342. Relatedly, with the one corrugation 202/340 including the swell 342 being an underside ridge/topside valley, the head 306 is inside the topside valley, and flush with the adjacent topside ridges.

As shown, with its installation, the fastener 304 secures the adaptor 302 to the frame rail 150 against the crossbeam 152. Accordingly, the crossbeam 152 is secured to the frame rail 150. With the fastener 304 engaging with the adaptor 302 overtop the bordering area 334, the fastener 304 secures the adaptor 302 to the frame rail 150 against the crossbeam 152 without tightening against the deck panel 142 at the bordering area 334. Accordingly, the deck panel 142 does not suffer the threat of becoming deformed by the fastener 304, and the structural arrangement 300 does not suffer the associated threat of becoming compromised.

Notwithstanding any combination of dimensional variations, manufacturing variations, assembly variations and the like in any combination of the frame rail 150, the crossbeam 152, the deck panel 142, the adaptor 302 and the fastener 304, with the fastener 304 overhanging the bordering area 334 with a gap between the fastener 304 and the bordering area 334, the fastener 304 will reliably install without tightening against the deck panel 142 at the bordering area 334. Relatedly, with the adaptor 302 underhanging the bordering area 334 with a gap between the adaptor 302 and the bordering area 334, the adaptor 302 will reliably structurally back the deck panel 142 against flexing toward the ground without impinging against the deck panel 142 at the bordering area 334. Moreover, with the adaptor 302 rising through the aperture 330 with a gap between the adaptor 302 and the bordering area 334, the adaptor 302 will reliably align with the threaded retainer 324 and the aperture 330 without impinging against the deck panel 142 at the bordering area 334.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
a frame rail;
a crossbeam resting atop the frame rail;
a deck panel resting atop the crossbeam, the deck panel including an aperture and a bordering area around the aperture;
an adaptor resting inside the crossbeam, the adaptor rising through the aperture and overtop the bordering area; and
a fastener extending from atop the adaptor to the frame rail through the adaptor and the crossbeam, the fastener overhanging the bordering area and engaged with the adaptor overtop the bordering area, and secured to the frame rail, thereby securing the adaptor to the frame rail against the crossbeam without tightening against the deck panel at the bordering area.

2. The vehicle of claim 1, wherein the bordering area is polymeric.

3. The vehicle of claim 1, wherein the deck panel is polymeric.

4. The vehicle of claim 1, wherein the deck panel is polymeric, the frame rail, the crossbeam, the adaptor and the fastener are metallic, and the adaptor has a casted construction.

5. The vehicle of claim 1, wherein the adaptor rises through the aperture with a gap between the adaptor and the bordering area.

6. The vehicle of claim 1, wherein the adaptor underhangs the bordering area with a gap between the adaptor and the bordering area.

7. The vehicle of claim 1, wherein the fastener overhangs the bordering area and engages with the adaptor overtop the bordering area with a gap between the fastener and the bordering area.

8. The vehicle of claim 1, wherein the fastener is threaded with the frame rail.

9. A vehicle, comprising:
a frame rail;
a hat-shaped crossbeam resting atop the frame rail, the crossbeam including a base engaged with the frame rail, upturned sides extending from the base, and outturned rests respectively extending from the sides;
a polymeric deck panel resting atop the crossbeam on the rests, the deck panel including an aperture and a bordering area around the aperture;
an adaptor resting inside the crossbeam on the base, the adaptor including a footing engaged with the base, and a riser projecting from the footing between the sides, the riser rising through the aperture and overtop the bordering area, and including a shoulder underhanging the bordering area; and
a fastener securing the adaptor to the frame rail against the crossbeam, the fastener including a head atop the adaptor, and a threaded shank extending to the frame rail through the adaptor and the crossbeam, the head overhanging the bordering area and engaged with the riser overtop the bordering area, and the threaded shank threaded with the frame rail, the fastener thereby securing the adaptor to the frame rail against the crossbeam without tightening against the deck panel at the bordering area.

10. The vehicle of claim 9, wherein the frame rail, the crossbeam, the adaptor and the fastener are metallic, and the adaptor has a casted construction.

11. The vehicle of claim 9, wherein the riser rises through the aperture with a gap between the riser and the bordering area.

12. The vehicle of claim 9, wherein either the shoulder underhangs the bordering area with a gap between the shoulder and the bordering area, the head overhangs the bordering area and engages with the riser overtop the bordering area with a gap between the head and the bordering area, or both.

13. The vehicle of claim 9, wherein the sides include an outward cant and an upward rise, and the footing includes a baseplate engaged with the base and upturned side lips engaged with the outward cant.

14. The vehicle of claim 9, wherein the deck panel includes a crosswise corrugation engaged with the rests, the corrugation including a swell between the rests, where the deck panel includes the aperture and the bordering area, and the head is inside the swell.

15. The vehicle of claim 9, wherein the bordering area includes a downturned edge flange coinciding with the aperture, and the shoulder underhangs the edge flange.

16. The vehicle of claim 15, wherein either the shoulder underhangs the edge flange with a gap between the shoulder and the edge flange, the head overhangs the bordering area and engages with the riser overtop the bordering area with a gap between the head and the bordering area, or both.

17. The vehicle of claim 9, wherein the riser includes a tube rising through the aperture whose rim is overtop the bordering area, and circumferentially-spaced fins projecting from the tube whose ends form shoulders underhanging the bordering area, and the head overhangs the bordering area and engages with the rim overtop the bordering area.

18. The vehicle of claim 17, wherein the tube rises through the aperture with a gap between the tube and the bordering area.

19. The vehicle of claim 17, wherein either the shoulders underhang the bordering area with a gap between the shoulders and the bordering area, the head overhangs the bordering area and engages with the rim overtop the bordering area with a gap between the head and the bordering area, or both.

20. A vehicle, comprising:
a metallic frame rail;
a metallic hat-shaped crossbeam resting atop the frame rail, the crossbeam including a base engaged with the frame rail, upturned sides extending from the base, and outturned rests respectively extending from the sides, the sides each including an outward cant and an upward rise;
a unitarily-formed polymeric bed box resting atop the crossbeam on the rests, the bed box including a deck panel, side panels and a bulkhead panel, the deck panel including a crosswise corrugation engaged with the rests, the corrugation including a swell between the rests, where the deck panel includes an aperture and a bordering area around the aperture, the bordering area including a downturned edge flange coinciding with the aperture;
a metallic adaptor having a casted construction resting inside the crossbeam on the base, the adaptor including a footing engaged with the base and the sides, and a riser projecting from the footing between the sides, the footing including a baseplate engaged with the base and upturned side lips engaged with the outward cant, the riser including a tube rising through the aperture with a gap between the tube and the bordering area whose rim is overtop the bordering area, and circumferentially-spaced fins projecting from the tube whose ends form shoulders underhanging the edge flange with gaps between the shoulders and the edge flange; and
a metallic fastener securing the adaptor to the frame rail against the crossbeam, the fastener including a head atop the adaptor inside the swell, and a threaded shank extending to the frame rail through the adaptor and the crossbeam, the head overhanging the bordering area and engaged with the rim overtop the bordering area with a gap between the head and the bordering area, and the threaded shank threaded with the frame rail, the fastener thereby securing the adaptor to the frame rail against the crossbeam without tightening against the deck panel at the bordering area.

* * * * *